United States Patent [19]

Werner et al.

[11] 4,394,470

[45] Jul. 19, 1983

[54] COLORED POLYETHYLENE TEREPHTHALATE MOULDING COMPOUND AND MOULDED PRODUCTS MADE THEREFROM

[75] Inventors: Marcel A. Werner, Huissen; Arnold Venema; Michael G. H. Pisters, both of Arnhem, all of Netherlands

[73] Assignee: Akzo N.V., Arnhem, Netherlands

[21] Appl. No.: 359,846

[22] Filed: Mar. 19, 1982

[30] Foreign Application Priority Data

Mar. 20, 1981 [NL] Netherlands .......................... 8101373

[51] Int. Cl.³ ............................................. C08K 5/15
[52] U.S. Cl. ......................................... 524/56; 524/58; 524/732
[58] Field of Search ........................... 524/56, 58, 732

[56] References Cited

U.S. PATENT DOCUMENTS

| | | | |
|---|---|---|---|
| 2,841,499 | 7/1958 | Grossi | 426/540 |
| 3,639,312 | 2/1972 | Turner | 524/56 |
| 4,107,105 | 8/1978 | Korf | 524/732 |
| 4,138,271 | 2/1979 | Ohira | 426/540 |

FOREIGN PATENT DOCUMENTS

| | | |
|---|---|---|
| 2258882 | 12/1971 | Fed. Rep. of Germany . |
| 55-50055 | 4/1980 | Japan . |
| 1106167 | 3/1966 | United Kingdom . |
| 1081965 | 9/1976 | United Kingdom . |

*Primary Examiner*—John C. Bleutge
*Assistant Examiner*—Patricia Short
*Attorney, Agent, or Firm*—Stevens, Davis, Miller & Mosher

[57] ABSTRACT

A polyethylene terephthalate moulding composition is disclosed having uniformly dispersed therein 10–25,000 ppm of caramel as a colorant. The colorant is non-toxic, does not affect the transparency of the polyester, and does not cause aldehyde formation. The caramel may have been formed in situ from a mono- or disaccharide which has been added to the bis(beta-hydroxyethyl)-terephthalate before or during polycondensation or to the molten polyester. The color may have been intensified by adding an alkaline reacting compound. The composition may moreover contain further colorants. The composition is particularly suitable for use in the manufacture of food containers such as boxes, trays and bottles.

16 Claims, No Drawings

COLORED POLYETHYLENE TEREPHTHALATE MOULDING COMPOUND AND MOULDED PRODUCTS MADE THEREFROM

This invention realtes to a coloured polyethylene terephthalate moulding compound, a process for the preparation of said moulding compound and to moulded products made from said compound. The invention also relates to a container for solids and liquids, such as a bottle which is made from said moulding compound.

For the preparation of a transparent, coloured polyethylene terephthalate moulding compound the use is known of a number of colourants of inorganic and organic composition. In view of the relatively high temperature at which polyethylene terephthalate moulding compounds are processed the thermal stability of these colourants should also be rather high. Melt-shaping polyethylene terephthalate, for instance by injection moulding, extrusion, etc., is attended with processing temperatures in the range of 260° to 300° C., which are to be withstood by the colourant.

The abstract of Japanese patent application J No. 55050-055 describes a transparent moulding compound of polyethylene terephthalate containing 0,001-2% by weight of $Fe_2O_3 \cdot xH_2O$. The particle size is very small and ranges from 0,01 to 0,03 μm. Bottles made from this moulding compound are transparent and have a brown colour. It is mentioned that the moulding compound may additionally contain other transparent colourants, such as phthalocyanine blue. It will be clear that adding phthalocyanine blue will result in obtaining a greenish moulding compound and bottle.

A drawback to the use of the afore-mentioned iron oxide is that it has a degrading effect on the polyester. Just at the high processing temperatures of the polyethylene terephthalate the iron oxide promotes degradation of the polyethylene terephthalate, so that after the moulding compound has been processed into a product, the polymer will contain decomposition residues. This may be particularly objectionable and undesirable when they are present in products such as bottles, cups, boxes, trays, etc., for packaging foodstuffs. Decomposition residues such as acetaldehyde, even in very small quantities, are found to impart an undesirable taste to these foodstuffs.

Another drawback to the use of this iron oxide consists in that the transparency of the polyethylene terephthalate, and of the product formed therefrom decreases with increasing content of iron oxide particles. Especially in the case of the somewhat deeper coloured products the transparency appears to have decreased considerably because of the required presence then of a relatively large amount of solid particles. Moreover, these particles act as nuclei in the crystallite formation of the polyethylene terephthalate and thus promote crystallization of the polyethylene terephthalate during the melting of the products, which also contributes to decreasing transparency.

An object of this invention is to provide a polyethylene terephthalate moulding compound coloured by a colourant which is very effective in small quantities, ensures transparent colouring and does not impair the quality of the polyethylene terephthalate.

Another object of the invention is to provide a polyethylene terephthalate moulding compound which is coloured by a non-toxic colourant.

A further object of the invention is to provide moulded products like containers made from the coloured polyethylene terephthalate moulding compound which are suitable for contact with foodstuffs.

Other objects and advantages of this invention will be apparent from the following description.

The foregoing objects and others are accomplished in accordance with this invention by providing a polyethylene terephthalate moulding compound wherein there are uniformly distributed 10-25000 ppm of caramel. By caramel is to be understood a product obtained by heating carbohydrates such as saccharose.

It has been found that already the use of a small amount of caramel as colouring agent for a polyethylene terephthalate moulding compound will result in very effective and very transparent colouring. Depending on the amount of caramel present, the colouring obtained will range from pale yellow of a more or less light ocherous shade to deep brown without loss of transparency. The caramel appears to be satisfactorily soluble in the polyethylene terephthalate and not to impair the quality of the polymer. More particularly, despite the high temperatures used in the preparation and processing of the polyethylene terephthalate the presence in it of caramel is found not at all to contribute to the decomposition thereof. For, acetaldehyde formation in the polyethylene terephthalate is found not to be greater than in the absence of caramel, which in view of the presence in the caramel of reactive components must be considered in unexpected factor. Nor is postcondensation in the solid phase found to be attended with additional decomposition. Postcondensation is carried out at about 220° C. for about 10-20 hours, depending on the endviscosity required. Nor does the addition of caramel appear to have any detrimental effect on the processability of the poyethylene terephthalate during melt-shaping; and the use of the appropriate amounts of caramel does not all result in any appreciable deterioration yet of the mechanical properties.

In addition to caramel not affecting the quality of the polyethylene terephthalate, its use offers various other advantages. For instance, caramel is not toxic, so that the caramel-containing moulding compound may be considered suitable for products in contact with foodstuffs.

Further, caramel appears not to stimulate the crystallization of polyethylene terephthalate. Moreover, the ocherous shade of the moulding compound is a good starting colour which may be combined with other transparent colours into different colours of a pleasant shade. For instance, combined with blue in the moulding compound a green colour is obtained.

To the moulding compounds there also may be added pigments in the form of white, small, solid particles, as a result of which the yellow to brown colour will be moderated, but the transparency will of course be reduced or, in case a few percent of pigment is used, generally be lost altogether. Use of coloured pigments will of course lead to colour shifts. Likewise, the transparency of the products made from the moulding compound may be reduced or be caused to completely disappear by allowing the polyethylene terephthalate of the shaped product to crystallize in a known manner at elevated temperature, as a result of which a pale yellow to brown opaque product is obtained. Bottles made in this way are particularly suitable for light- and UV-sensitive beverages and other materials.

There is no special need for the caramel to be added to and blended in the molten polyethylene terephthalate. The caramel also may be added to the ethylene terephthalate during or at the start of the polycondensation thereof and it is not found then to have any detrimental effect on polycondensation. Nor is it necessary to start from caramel as such, it having been found that the caramel can be satisfactorily formed in situ from a saccharide such as a mono- or disaccharide added to the ethylene terephthalate ester before or during polycondensation thereof or added to the molten polyethylene terephthalate. Examples of suitable saccharides include fructose, glucose, galactose, saccharose, lactose, maltose, dextrose. Preferred saccharides are ketones such as fructose and sorbose because of the rapid formation of caramel. Also sorbitol is a suitable caramel former. An amount of 500 ppm of caramel added before polycondensation of the ethylene terephthalate ester leads to a moulding compound having a soft-ocherous colour. Generally, an amount of 500-5000 ppm of saccharide added befoe polycondensation will be sufficient. Using 2000 ppm of fructose results in an arnica-yellow colour and adding 5000 ppm of fructose already results in an umberlike colour. Fructose in amounts of 2000-4000 ppm is considered suitable for polyester beer bottles.

Above 5000 ppm the colour deepens to a very dark brown. Generally, an amount in the range of 500-10000 ppm will suffice to obtain some particularly desired depth of colour. If the caramel is added as such, the amount needed in generally somewhat smaller and may be in the range of 10 to 10000 ppm or even 10 to 5000 ppm, because the colouring effect of commercially available caramel is somewhat stronger than that of the caramel formed in situ. Using these additives in amounts higher than 25000 ppm would serve no purpose actually in that it does not intensify the very deep colour any further. It should be added that these effects are obtained with polyethylene terephthalate which in the absence of said additive would be transparent, and hence, amorphous and colourless.

The colouring produced by adding saccharide may still be intensified if before, during or after the polycondensation of the ester there is also added an alkaline substance in an amount of 100-2500 ppm, based on the ester. It is preferred that this substance should not have any crystallization promoting effect on the polyethylene terephthalate. Preference is given to Na- or K-hydroxide, -hydrocarbonate or -carbonate in amounts of 100 to 1000 ppm.

By including other transparent colouring agents or pigments in the moulding compound a great many differently coloured products can be made. For instance, by varying the amount of caramel and the amount of, say, the known blue colouring agent ultramarine or phthalocyanine blue it is possible to obtain products in various shades of green.

Adding 4000 ppm of fructose and 75 ppm of phthalocyanine blue prior to the polycondensation of the ester results in containing a tourmalinic colour, which is excellently suitable for soft-drink bottles.

Generally, the process according to the invention comprises making a coloured polyethylene terephthalate moulding compound by incorporating therein a finely divided caramel in an amount of 10-25000 ppm. The process comprises the addition prior to, during or after polycondensation of caramel as such or of mono- or dissaccharides from which caramel is formed in situ.

The moulding compound is of special importance for making containers for drinks and other liquids and for foodstuffs. Such containers are bottles, cups, tins, boxes, trays; but the moulding compound also may be used for making packaging film, sheet material, cards, strapping, etc.

The polyethylene terephthalate moulding compound may moreover contain the usual adjuvants, such as stabilizers, fillers, lubricants, etc., depending on the end use envisaged. Also other polymeric substances may still be included in the moulding compound.

The invention will be further described in the following examples.

EXAMPLE 1

Polyethylene terephthalate was prepared by transesterification in an autoclave of dimethyl terephthalate and ethylene glycol in the presence of 340 ppm of manganese acetate, $Mn(OAc)_2.4$ aq., as catalyst, followed by polycondensation of the ester. After transesterification and at the start of the polycondensation there were added, at a temperature of 250° C., 50 ppm of trimethyl phosphate as stabilizer and 250 ppm of antimony trioxide as polycondensation catalyst. The final polycondensation temperature was 280° C. and the pressure about 10 Pa. In a similar procedure two batches were still prepared in such a way that together with the antimony trioxide powdered fructose was added in an amount of, respectively, 2000 and 4000 ppm, calculated on the polyethylene terephthalate prepared.

The resulting batches were granulated in the usual manner. By analysis of the polyethylene terephthalate the results mentioned in Table 1 were obtained.

TABLE 1

| Fructose ppm | 0 | 2000 | 4000 |
|---|---|---|---|
| $\eta_{rel}$ | 1,622 | 1,599 | 1,716 |
| $e_c$ meq/kg | 16,8 | 15,9 | 20,0 |
| DEG wt. % | 0,64 | 0,59 | 0,59 |
| $e_m$ meq/kg | 5,3 | 1,7 | 4,4 |

The relative viscosity was measured on a 1% solution in m-cresol at 25° C.;

$e_c$ denotes the carboxyl endgroup concentration in meq/kg;

DEG denotes the diethylene glycol concentration in percent by weight;

$e_m$ denotes the methylester endgroup concentration in meq/kg.

From these values it can been seen that the fructose has had no detrimental effect at all on the quality of the polyethylene terephthalate.

EXAMPLE 2

The batches prepared in accordance with Example 1 were subjected to postcondensation in the solid phase by keeping the granulate at a temperature of 220° C. and a pressure of about 10 Pa for 15 hours. By analysis the results mentioned in Table 2 were obtained.

TABLE 2

| Fructose ppm | 0 | 2000 | 4000 |
|---|---|---|---|
| $\eta_{rel}$ | 1,756 | 1,774 | 1,745 |
| $e_c$ meq/kg | 12,4 | — | 10,4 |

These values, too, show that the fructose has no unfavourable effect during postcondensation.

EXAMPLE 3

Of the moulding compounds prepared in accordance with Example 2 plaques measuring 50×50×3 mm were made on an Allburg Allrounder injection moulding machine of the 221/50-250 type. The cylinder temperature was 285° C. and the mould temperature 14° C. The plaques obtained were transparent. On this plaques transmittance measurements were carried out with the aid of a Hunterlab spectrophotometer of the D54P-5 type. From the transmittance values obtained the tristimulus values X, Y and Z were calculated for the D65 light source and CIE-1964 standard observer at an angle of 10°. From the values obtained the L*, a* and b* values were calculated in accordance with DIN 6174 with the aid of the CIE-1976 formulae. These so-called CIELAB values define a colour in a rectangular coordinate system having 3 axes, where L* = the parameter on the lightness scale, ranging from 0 (black) to 100 (white);
a* = the parameter on the red—green scale, with positive values for red and negative values for green;
b* = the parameter on the yellow—blue contrast scale, with positive values for yellow and negative values for blue.

The measuring results are mentioned in Table 3.

TABLE 3

| Fructose ppm | 0 | 2000 | 4000 |
|---|---|---|---|
| L* | 94,16 | 86,85 | 76,28 |
| a* | −0.29 | −1,38 | 5,28 |
| b* | 2,73 | 31,81 | 57,91 |

It should be noted that the L* values are not a measure of the transparency of the material, but only refer to the lightness, which is a different physical factor that is partly determined by the colour itself. From the values found it is apparent that there has mainly been a great shift on the yellow—blue scale. Upon visual inspection the plaques appear to be as clear as glass and, hence, do not show any turbidity. The plaque without fructose is colourless, the one containing 2000 ppm of fructose has a pale umberlike colour and the one with 4000 ppm is dark brown.

EXAMPLE 4

In the moulding compounds prepared in accordance with Example 2 there were incorporated 50 ppm of a transparent blue colouring agent by coating the granulate with the colouring matter, followed by extrusion into test plaques in accordance with the procedure of Example 3. The colouring agent was Cu-phthalocyanine blue, Colour Index pigment blue 15, C.I. No. 74160 type Cromophtal 4 Gn of Ciba Geigy.

The values measured with the spectrophotometer are given in Table 4.

TABLE 4

| Fructose ppm | 0 | 2000 | 4000 |
|---|---|---|---|
| blauw ppm | 50 | 50 | 50 |
| L* | 80,22 | 71,35 | 59,70 |
| a* | −37.93 | −43,80 | −39,02 |
| b* | −15,57 | 15,73 | 34,70 |

The plaques display absence of turbidity, the ones containing 2000 ppm of fructose being light green and those containing 4000 ppm being deep green.

EXAMPLE 5

In the manner of Example 4 test plaques were made in order of increasing Cu-phthalocyanine content, all of them containing 4000 ppm of fructose. The values determined with the spectrophotometer are given in Table 5.

TABLE 5

| Fructose ppm | 4000 | 4000 | 4000 | 4000 | 4000 |
|---|---|---|---|---|---|
| blue ppm | 0 | 50 | 60 | 70 | 80 |
| L* | 76,28 | 59,70 | 58,80 | 57,62 | 56,11 |
| a* | 5,28 | −39,02 | −37,59 | −40,32 | −44,05 |
| b* | 57,91 | 34,70 | 33,46 | 32,10 | 29,73 |

These plates, too, show absence of turbidity. According as the amount of blue increases, the colour turns to deep greenish-blue.

EXAMPLE 6

In accordance with the procedure described in Example 1 polyethylene terephthalate containing 4000 ppm of fructose was prepared. At the start of polycondensation also 75 ppm of Cu-phthalocyanine blue were added. The polymer was subjected to postcondensation at 320° C. until a relative viscosity of 1,98 was obtained.

The resulting product was processed into test plaques which were subjected to transmittance measurements. The values obtained are given in Table 6.

TABLE 6

| Fructose | 4000 ppm |
|---|---|
| blue | 75 ppm |
| L* | 49,10 |
| a* | −34,92 |
| b* | 31,03 |

The plaques are perfectly transparent and green.

EXAMPLE 7

Of polyethylene terephthalate respectively containing no and 4000 ppm of fructose the acetaldehyde content was determined before and after re-extrusion at 290° C. on a single-screw 90 mm extruder. The moulding compound had been prepared in accordance with Example 2. The amounts of acetaldehyde are mentioned in Table 7.

TABLE 7

| Fructose ppm | 0 | 4000 |
|---|---|---|
| acetald. content ppm | | |
| before extrusion | 1 | 1 |
| before extrusion | 8,4 | 7,9 |

It can be seen that the fructose caramelized in situ has no stimulating effect on the formulation of acetaldehyde, which formation in itself is due to the thermal degradation of the polymer.

EXAMPLE 8

In the manner described in Example 2 two moulding compounds were prepared, one of them containing 2000 ppm of fructose and the other 1000 ppm of fructose and 500 ppm of $K_2CO_3$. The carbonate was added together with the fructose. Of the two moulding compounds test plaques were made by injection moulding. The plates obtained were transparent and had a light numberlike colour which was slightly darker for the moulding compound containing 1000 ppm of fructose and 500 ppm of $K_2CO_3$ than for that containing 2000 ppm of fructose.

EXAMPLE 9

In the manner described in Example 1 polyethylene terephthalate was prepared using amorphous germanium oxide instead of antimony oxide as polycondensation catalyst. Of the polyethylene terephthalate 2 batches were prepared, one of them containing 4000 ppm of fructose and the other 4000 ppm of water-soluble caramel, added at the start of the polycondensation process. The relative viscosity of either batch was 1,70. The caramel-containing polymer was a darker brown than the polymer containing the fructose.

The two batches were each mixed in a ratio of 1:4 with a correspondingly prepared polyethylene terephthalate which however did not contain the additive. Of the material obtained test plaques were made by injection moulding and transmittance measurements were carried out. The values obtained are given in Table 8.

TABLE 8

|  | Fructose ppm 8000 ppm | caramel 800 ppm |
|---|---|---|
| L* | 85,41 | 49,56 |
| a* | 0,84 | 16,65 |
| b* | 22,94 | 47,79 |

The measuring results show that caramel has a greater colouring effect than fructose. The colour obtained with 800 ppm of caramel corresponds to the colour obtained with 3000–4000 ppm of fructose.

What is claimed is:

1. A coloured polyethylene terephthalate moulding compound, characterized in that in the moulding compound there is uniformly distributed 10–25000 ppm of caramel.

2. A moulding compound according to claim 1, characterized in that the moulding compound is transparent.

3. A moulding compound according to claim 1, characterized in that the caramel is formed in situ from a mono- or disaccharide which has been added to the ethylene terephthalate ester before or during polycondensation thereof.

4. A moulding compound according to claim 1, characterized in that the caramel is formed in situ from a mono- or disaccharide which has been added to molten polyethylene terephthalate.

5. A moulding compound according to claim 3, characterized in that the amount of saccharide added is in the range of 500 to 10000 ppm.

6. A moulding compound according to claim 1, characterized in that the caramel has been blended in the molten polyethylene terephthalate in an amount of 10 to 10000 ppm.

7. A moulding compound according to claim 3, characterized in that the colouring has been intensified by the addition, before during or after the polycondensation of the ester, of an alkaline substance in an amount of 100 to 2500 ppm, based on the ester.

8. A moulding compound according to claim 7, characterized in that the alkaline substance is added in an amount of 100 to 1000 ppm and is selected from the group consisting of Na-hydroxide, K-hydroxide, Na-hydrocarbonate, K-hydrocarbonate, Na-carbonate, K-carbonate.

9. A moulding compound according to claim 1, characterized in that the moulding compound also contains one or more other colourants.

10. A process for preparing a coloured polyethylene terephthalate moulding compound, which comprises incorporating caramel substantially uniformly in the polyethylene terephthalate, the caramel being used in an amount of 10–25000 ppm.

11. The process of claim 10 wherein the caramel is formed in situ by mixing mono- or disaccharide with the ethylene terephthalate ester before or during polycondensation thereof.

12. The process of claim 10 wherein the caramel is formed in situ by mixing mono- or disaccharide with molten polyethylene terephthalate.

13. The process of claim 10 wherein caramel in an amount of 10–10000 ppm is mixed with molten polyethylene terephthalate.

14. The process of claim 11 wherein before, during or after the polycondensation of the ethylene terephthalate ester an alkaline substance is mixed therewith in an amount of 100 to 2500 ppm, based on the ester.

15. The process of claim 14 wherein the alkaline substance is selected from the group consisting of Na-hydroxide, K-hydroxide, Na-hydrocarbonate, K-hydrocarbonate, Na-carbonate, K-carbonate.

16. A coloured polyethylene terephthalate container for solids or liquids, characterized in that the polyethylene terephthalate contains 10–25000 ppm of caramel.

* * * * *